Patented Nov. 26, 1935

2,022,617

UNITED STATES PATENT OFFICE 2,022,617

PROCESS OF OBTAINING THEVETIN FROM THE SEEDS OF THEVETIA NERIIFOLIA JUSS. OR EXILE NUT

Ko Kuei Chen and Amy Ling Chen, Indianapolis, Ind., assignors to Eli Lilly and Company, Indianapolis, Ind., a corporation of Indiana No Drawing. Application April 16, 1934, Serial No. 720,810

7 Claims. (Cl. 87—28)

It is the principal object of our invention to obtain in substantially pure form the active principle "Thevetin", of the nuts or seeds of the Thevetia neriifolia Juss., known variously as "Exile oleander", "Ahouai", "Snake nut", "Jorojoro", "Be-still tree", and other names; and incidentally to obtain separately certain other substances, previously unknown, particularly "Ahouain", "Kokilphin", and a phytosterolin, all co-present with thevetin in these nuts. For convenience we shall refer to the tree as exile oleander, and to the nuts as exile nuts.

Thevetin, the active principle of these exile nuts, is a heart stimulant of the general digitalis type. The fundamental difference is that thevetin has a prompt action, and one of relatively shorter duration, while digitalis has a delayed action which starts only after a latent period and has a relatively longer duration.

The exile oleander is indigenous to South America and the West Indies, but is now cultivated in the East Indies, India, the Hawaiian Islands, and western Africa. It is not the same as the common oleander of medicine—the nerium oleander. Its nuts are brown or black. The toxic property of these nuts has been known to European scientists since the latter part of the 16th century, and undoubtedly to the native Indians since a much earlier date. Among those who have investigated these nuts, and commented in various ways on them and their properties, are Pison and Clusius (1574), Madianne (1827), Dumontier (1856), De Vry (1863), Dey (1881), Ayyar (1931), Chopra and Mukerjee (1933), and various others.

So far as we are aware, no prior investigator has obtained a pure thevetin, capable of producing consistent quantitative results either chemically or pharmacologically.

In obtaining our thevetin, we have proceeded in general as follows:

The Exile-nut kernels, obtained by cracking and removing the shells, are crushed and/or ground, and macerated with ether for one or two days to defat them. The ether extract is separated, as by decantation. For increased defatting, the solid residue is ground more finely, and the ground material is then re-extracted with ether, desirably to exhaustion, as by continuous percolating in a Soxhlet extractor.

The ether extract or extracts may be discarded, if thevetin alone is wanted, for it contains substantially no thevetin. However, it does contain a substance which is almost certainly a phytosterolin; and if that is desired, the ether extract, or combined ether extracts if several are made and they are combined, may be processed further; as will be explained hereinafter.

The solid residue or marc remaining after the ether extraction contains substantially all the desired thevetin; and also some other things, although they are of less importance. This solid residue or marc is very irritating to the nose, and causes sneezing.

The thevetin in this thevetin-containing residue or marc may be obtained as follows:

Desirably after such marc has been exhausted of fats by the ether extraction above described—although complete exhaustion is not essential, and indeed the entire ether extraction may if desired be omitted—the thevetin-containing residue or marc is repeatedly extracted with methyl alcohol; and the alcoholic extracts are combined, and the combined extract evaporated to dryness under vacuum. The residue after evaporation is re-dissolved in warm absolute ethyl alcohol. This alcoholic solution is allowed to stand over night at room temperature, and a sediment forms. The sediment and the supernatant liquid are suitably separated, as by decanting or filtering.

The supernatant liquid contains chiefly thevetin; and the sediment contains chiefly ahouain and kokilphin, described more fully hereinafter.

*Thevetin*

The thevetin-containing liquid, after being separated from the sediment, is subjected to fractional precipitation with ether; which is added carefully, in small quantities, and the separate precipitates removed, as by filtration, until the addition of ether causes no further precipitation. The precipitates, preferably separately, are washed in ether, dried in vacuum, powdered in a mortar, and dissolved in the smallest possible amount of warm 85% isopropyl alcohol. When these alcoholic solutions are allowed to stand at room temperature, thevetin appears as a fine white powder, which can be separated by filtration under suction. While it is possible to combine the fractional precipitates, and to treat them together, we prefer to treat them separately; as the last few fractions of the precipitate yield thevetin more quickly than do the first or second fractions. The crude thevetin which is obtained by this treatment of the fractional precipitates is combined; and the combined crude thevetin is purified by repeated recrystallization (twice usually being sufficient) from 75% to 90% isopropyl alcohol.

Thevetin crystallizes in clusters from 90% isopropyl alcohol, and in fine needles from 75% to 80% isopropyl alcohol. It is soluble in pyridine, methyl alcohol, ethyl alcohol, and n-propyl and isopropyl alcohols; soluble in both cold and warm water, but less so than in alcohol; and practically insoluble in ether, acetone, chloroform, and benzene. It melts at about 193° C. (corrected). A 2% solution in methyl alcohol has been found to give a polarimetric reading of —2.5° in a 2-decimeter tube, with sodium light; from which the specific rotation of thevetin is determined as $$[\alpha]_D^{28} \ -62.5°.$$

On being treated with concentrated sulphuric acid, thevetin produces a yellow color, which turns to purple; with concentrated hydrochloric acid, a light yellow color, which changes to bluish green; and with concentrated nitric acid, a light yellow color, which persists. It gives a positive test with sodium nitroprusside or with Tollen's reagent. It gives a negative reaction in the Keller-Killiani test; which seems to indicate the absence from the thevetin molecule of any desoxy sugar, such as digitoxose or cymarose. Its solutions are bitter-tasting. It is evidently a glucoside—a cardiac glucoside, from its cardiac effect.

From determinations of molecular weight by the Rast method, (Ber. Deut. Chem. Gesellsch., 55, 1051, year 1922,) and from analyses made for carbon and for hydrogen, thevetin appears to have the empirical formula $C_{29}H_{46}O_{13}.2H_2O$. For the analyses, the crystalline thevetin was dried at 80° C., in high vacuum over phosphorous pentoxide, with the following results:

*Air-dry substance*

4.868 mgm.: 0.276 mgm. loss of weight
5.073 mgm.: 0.269 mgm. loss of weight
5.061 mgm.: 0.276 mgm. loss of weight
4.848 mgm.: 0.269 mgm. loss of weight $C_{29}H_{46}O_{13}.2H_2O$ { Calculated___$H_2O$ 5.64%
Found_____$H_2O$ 5.67, 5.30, 5.45, 5.55%.

*Anhydrous substance*

4.804 mgm.: 10.155 mgm. $CO_2$, 3.270 mgm. $H_2O$
4.542 mgm.: 9.410 mgm. $CO_2$, 3.010 mgm. $H_2O$
4.450 mgm.: 9.440 mgm. $CO_2$, 3.000 mgm. $H_2O$ 0.300 mgm. in 4.260 mgm. camphor: 4.7° Δ
0.559 mgm. in 6.270 mgm. camphor: 5.9° Δ
0.312 mgm. in 4.630 mgm. camphor: 4.5° Δ

$C_{29}H_{46}O_{13}$. { Calculated_____C 57.76, H 7.70%.
Found_____C 57.68, H 7.62%,
C 57.66, H 7.57%,
C 57.86, H 7.54%.

Molecular weight calculated_____ 602
Molecular weight found_____ 600, 605, 599

The empirical formula is not asserted positively, for its correctness will depend upon the outcome of a study of the sugar portion and of the genin (non-sugar) portion of the cardiac-glucoside molecule.

Hydrolysis of thevetin according to the method of Windaus and Hermanns (Ber. Deut. Chem. Gesellsch., 48, 979, year 1915) results in the formation of a resinous material. The supernatant fluid, upon neutralization with silver carbonate, reacts with α-naphthol and concentrated sulphuric acid, to form a reddish purple ring. With a solution of orcinol and hydrochloric acid (Bial's reagent) this supernatant fluid yields a brown color, and forms a precipitate; which indicates that the sugar portion of the glucoside is not likely a simple pentose.

The pharmacological effects of thevetin upon the amphibian and mammalian heart are in general like those of digitalis; but more prompt in starting and shorter in duration.

In frogs, thevetin in small doses (0.002–0.004 mgm. per gm. injected into the lymph sac has little effect upon motor activity, but sometimes causes a slight restlessness. Somewhat larger amounts, similarly administered, usually cause systolic standstill of the ventricle in an hour. Doses of 0.05 to 0.1 mgm. per gm. result in a stupor.

By perfusion into the inferior vena cava of the frog, thevetin in a concentration of 1:20,000 to 1:10,000 produces an initial augmentation of the ventricular contraction, but this augmentation lasts only for one or two minutes and is followed by diminution of systole and diastole, especially diastole. It causes a diminution of the heart rate. Occasionally partial or complete A-V block and extra systoles appear. In twenty or thirty minutes after injection, in the concentration noted, the ventricle stops at systole, while the auricle may continue beating for some time; and normal Ringer's solution is not able to restore the original cardiac activity.

Since thevetin is soluble in water, and is easily absorbed into the circulation, it can be easily standardized by the U. S. P. frog method. (The Pharmacopoeia of the United States, J. B. Lippincott Co., Philadelphia, 10th revision, 393, year 1926.) The minimal systolic dose for different lots is from 0.004 to 0.005 mgm. per gm.

In etherized cats, a dose of 1 mgm. per kgm. injected rapidly by vein raises the arterial blood pressure, with a gradual return to the initial level. During the rise in blood pressure slowing of the heart rate occurs, followed by arrhythmia, as may be shown either by kymographic records or by auscultation. We have established a "cat unit", which is the least amount per kilogram that on intravenous injection stops the heart-beat of an etherized cat. It is 0.85 mg. per kg. This cat unit is a convenient unit for use by clinicians, because they are familiar with it in connection with their administration of digitalis.

Electrocardiograms (taken from Lead II in cats) show that thevetin produces typical effects of digitalis-type intoxication during the injection of a 1:20,000 solution intravenously at the rate of 1 cc. per minute. Essential changes, in substantially the general order (which is not always quite the same) of their occurrence, are bradycardia, inversion of the T wave, P-R prolongation, ventricular rhythm, A-V dissociation, secondary tachycardia, and finally, ventricular fibrillation; which last causes death.

Thevetin also has a minimal emetic dose in pigeons and in cats. The minimal emetic dose in pigeons is 0.25 mg. per kg.; and in cats is 0.3 mg. per kg. Both of these are with intravenous injection. The determination of the minimal emetic dose for pigeons follows that which has been used by Hanzlik for digitalis; and that for cats follows that which has been developed by us for digitalis-like substances.

When thevetin is incubated with sheep's red-blood-cell corpuscles at 37° C. for an hour, hemolysis does not occur in thevetin concentrations ranging from 1:8000 to 1:500.

Pure thevetin is found not to cause necrosis at the site of injection; but, like other digitaloid glucosides, may produce slight irritation, chiefly manifested as a slight pain.

By tabulating data available, it has been found that the average P-R prolongation occurred at 17%, maximal slowing of the heart at 30%, and ectopic rhythm at 31% of the fatal dose of thevetin; as against P-R prolongation at 48%, maximal slowing at 56%, and ectopic rhythm at 61% of the fatal dose of digitoxin, and as against P-R prolongation at 37%, maximal slowing at 58%, and ectopic rhythm at 54% of the fatal dose of ouabain. Thevetin thus has a more prompt action than has either digitoxin or ouabain, and requires a smaller percentage of the fatal dose to produce digitalis-like effects.

Thevetin has also been used in human cases—particularly in the treatment of auricular fibrillation and flutter, myocardial insufficiency, heart block, and hyperthyroidism with cardiac decompensation. It acts generally like digitalis, but its effect both appears and disappears more rapidly than does that of digitalis. Thevetin is effective either when taken by mouth or when injected intravenously. A combination of thevetin and digitalis offers the advantages of both thevetin and digitalis. As determined by tests on animals, particularly on frogs, cats, and dogs, thevetin is approximately one-eighth to one-seventh as active as ouabain (G-strophanthin) but also approximately one-eighth to one-seventh as toxic as ouabain; and this activity ratio appears also to hold for man, although the toxic ratio as determined by ensuing death has of course not been determined for man.

If Exile-nut components other than thevetin are desired, they may be obtained as follows:

Phytosterolin

The ether extract, or combined ether extracts if several are made, from the first extraction of the crushd exile-nut kernels is subjected to evaporation to remove the ether; which leaves behind a light yellow fatty oil. Such an oil has been obtained and studied to some extent by previous investigators.

We have found that when this fatty oil is allowed to stand at room temperature, a solid appears at the bottom and sides of the container—a solid which is usually at least partially in crystalline form. This is separated from the supernatant liquid, as by filtration, and washed with ether; which leaves a white powder. This powder may be purified by repeated recrystallization from a mixture of pyridine and alcohol; which procedure yields large opaque spheroidal crystals which melt at 291–292.5° C. (corrected) with charring.

The substance thus obtained gives a positive reaction with either the Liebermann-Burchard test or the Salkowski test; and upon hydrolyzing in a mixture of hydrochloric acid and alcohol in a sealed tube on a water bath, filtering, and neutralizing the filtrate, such neutralized filtrate readily reduces Fehling's solution. It is almost certainly a phytosterolin. Elementary analyses indicate that it has the empirical formula $C_{27}H_{45}O.C_6H_{11}O_5$ (calculated C 72.20%, H 10.29%; found, on duplicate determinations, C 72.15% and 72.15%, H 10.26 and 10.41%). The actual analysis on which this is based is as follows:

4.691 mg.:12.405 mg. $CO_2$, 4.300 mg. $H_2O$
4.311 mg.:11.400 mg. $CO_2$, 4.010 mg. $H_2O$.

Ahouain

The sediment which formed when the solution in absolute ethyl alcohol was allowed to stand over night contains chiefly ahouain and kokilphin, as has already been stated.

This sediment is treated with warm absolute ethyl alcohol. Although the sediment settled from a solution made with warm absolute ethyl alcohol, the sediment does not at this later stage go wholly into solution, but leaves an undissolved residue. This residue and the supernatant liquid are suitably separated, as by decantation.

The residue contains chiefly ahouain; and the supernatant liquid contains chiefly kokilphin.

The ahouain-containing residue is dissolved in methyl alcohol, and is subjected to fractional precipitation with chloroform. The last fractional precipitates obtained are chiefly ahouain; and these are crystallized from absolute methyl alcohol, in a desiccator saturated with ether vapor.

We are not able to determine the molecular weight of ahouain by the Rast camphor method, (Ber. Deut. Chem. Gesellsch., 55, 1051 year 1922,) nor by the boiling-point method in methyl alcohol. By determinations by the Barger method (Jour. Chem. Soc., 85, 286, year 1904) made for us by Dr. J. B. Whitman, yielded a set of relatively consistent values, with azobenzene as a standard and methyl alcohol as the solvent. On the basis of these determinations, and the results of combustion analyses, we believe that ahouain has the empirical formula $C_{10}H_{19}O_{10}$ (calculated C 40.12%, H 6.40%, mol. wt. 299; found, on duplicate determinations, C 40.04% and 40.06%, H 6.43% and 6.44%, mol. wt. 317, 263, 292, and 333). The actual analysis on which this is based is as follows:

4.664 mg.:6.845 mg. $CO_2$, 2.680 mg. $H_2O$
4.188 mg.:6.150 mg. $CO_2$, 2.410 mg. $H_2O$.

Ahouain has no action on the frog's heart in dosage of 0.5 mgm. per gm. administered subcutaneously. Intravenous injection of it in rabbits, in doses of 2 mgm. per kgm., increases the blood sugar from 18 to 24 mgm. per 100 cc. of blood.

Kokilphin

The kokilphin-containing supernatant liquid which was separated from the ahouain-containing residue is concentrated by vacuum distillation to a small volume, and benzene is gradually added to the concentrate until no further precipitation occurs. On standing for some time, crystals of kokilphin are deposited at the bottom. These are separated, as by decantation, and purified by recrystallization from absolute or 95% ethyl alcohol.

Kokilphin crystallizes from absolute ethyl alcohol in angular prisms which melt sharply at 188.5–189° C. (corrected). It is soluble in water and in methyl alcohol, less soluble in ethyl alcohol, and almost insoluble in ether, benzene, and acetone. It does not show color displays with concentrated minerals acids, such as sulphuric, nitric, or hydrochloric acids. When kokilphin is boiled with Fehling's solution or with Benedict's solution no apparent reaction takes place; but if a solution of kokilphin is previously hydrolyzed with an acid, and then treated with the sugar reagents, reduction occurs.

Molecular weight determinations according to the Rast method and elementary analyses indicate that kokilphin has the empirical formula $C_{33}H_{61}O_{30}$ (calculated, C 42.25%, H 6.56% mol. wt. 937; found, on duplicate determinations, C 42.04 and 42.21%, H 6.51 and 6.53%, mol. wt. 935 and 953). The actual analysis on which this is based is as follows:

4.490 mg.:6.920 mg. $CO_2$, 2.610 mg. $H_2O$
4.521 mg.:6.995 mg. $CO_2$, 2.640 mg. $H_2O$
0.208 mg. in 3.070 mg. camphor:2.9°Δ
0.245 mg. in 3.120 mg. camphor:3.3°Δ.

In frogs, kokilphin causes no change in cardiac activity on subcutaneous injection of 4.0 mgm. per gm. In doses of 2 mgm. per kgm., administered intravenously in rabbits, it produces a slight hyperglycemia; the increase in blood sugar in two experiments not exceeding 11 to 14 mgm. per 100 cc. of blood.

To facilitate understanding of the steps of the specific process which is described by way of example, the following flow sheet will be of service:

jecting such solution to fractional precipitation with ether to produce a precipitate of thevetin.

3. The process of obtaining thevetin from the kernels of exile nuts, comprising extracting them with methyl alcohol and evaporating such alcoholic extract to dryness, redissolving the residue after evaporation in absolute ethyl alcohol, allowing the alcoholic solution to stand until a sediment forms, and separating that sediment from the supernatant liquid, and subjecting such supernatant liquid to fractional precipitation with ether to produce a precipitate of thevetin.

4. The process of obtaining thevetin from the kernels of exile nuts, comprising extracting them with methyl alcohol and evaporating such alcoholic extract to dryness, redissolving the residue after evaporation in absolute ethyl alcohol, and subjecting such solution to fractional precipitation with ether to produce a precipitate of thevetin.

5. The process of obtaining thevetin from the kernels of exile nuts, comprising defatting them, forming an alcoholic solution of the defatted kernels, allowing such solution to stand until a sediment appears, separating that sediment from the supernatant liquid, and precipitating thevetin from the supernatant liquid with ether.

*Flow sheet*

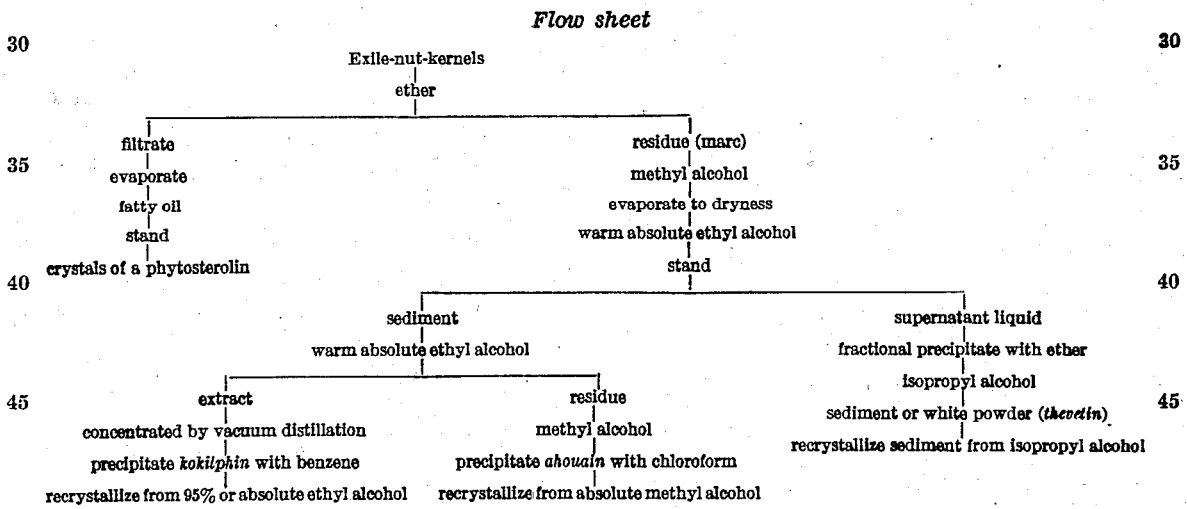

We claim as our invention:

1. The process of obtaining thevetin from the kernels of exile nuts, comprising defatting them with ether, extracting the residue or marc with methyl alcohol and evaporating such alcoholic extract to dryness, redissolving the residue after evaporation in absolute ethyl alcohol, allowing the alcoholic solution to stand until a sediment forms, and separating that sediment from the supernatant liquid, and subjecting such supernatant liquid to fractional precipitation with ether to produce a precipitate of thevetin.

2. The process of obtaining thevetin from the kernels of exile nuts, comprising defatting them with ether, extracting the residue or marc with methyl alcohol and evaporating such alcoholic extract to dryness, redissolving the residue after evaporation in absolute ethyl alcohol, and sub- 6. The process of obtaining thevetin from the kernels of exile nuts, comprising forming an alcoholic solution of the kernels, allowing such solution to stand until a sediment appears, separating that sediment from the supernatant liquid, and precipitating thevetin from the supernatant liquid with ether.

7. The process of obtaining thevetin from the kernels of exile nuts, comprising forming an alcoholic solution of the kernels, allowing such solution to stand until a sediment appears, separating that sediment from the supernatant liquid, precipitating thevetin from the supernatant liquid with ether, and purifying such precipitate by recrystallization from isopropyl alcohol.

KO KUEI CHEN.
AMY LING CHEN.